United States Patent [19]

Sorensen

[11] Patent Number: 4,968,243

[45] Date of Patent: Nov. 6, 1990

[54] INJECTION MOLDING APPARATUS REDUCING COUNTERACTIVE DEFORMATION OF DESYNCHRONOUSLY FILLED COAXIALLY LOCATED MOLDING CAVITIES

[76] Inventor: Jens O. Sorensen, P.O. Box 2274, Rancho Santa Fe, Calif. 92067

[21] Appl. No.: 388,600

[22] Filed: Aug. 1, 1989

[51] Int. Cl.$^5$ .............................................. B29C 45/32
[52] U.S. Cl. ............................ 425/572; 264/297.2; 264/328.8; 264/328.11; 425/574; 425/588
[58] Field of Search ............... 264/297.2, 328.7, 328.8, 264/328.11; 425/572, 581, 588, 595, 450.1, 451.9, DIG. 127, 542, 574

[56] References Cited

U.S. PATENT DOCUMENTS

| | | | |
|---|---|---|---|
| 3,049,757 | 8/1962 | Hagerborg | 425/593 |
| 3,417,433 | 12/1968 | Teraoka | 425/587 |
| 3,707,342 | 12/1972 | Lohmann | 425/450.1 |
| 4,005,964 | 2/1977 | Bishop | 425/588 |
| 4,090,837 | 5/1978 | Balevski et al. | 425/588 |
| 4,153,405 | 5/1979 | Elly et al. | 425/338 |
| 4,242,073 | 12/1980 | Tsuchiya et al. | 425/555 |
| 4,400,341 | 8/1983 | Sorensen | 264/328 |
| 4,464,327 | 8/1984 | Sorensen | 264/328.8 |
| 4,539,171 | 9/1985 | Sorensen | 264/328.8 |

*Primary Examiner*—Timothy Heitbrink
*Attorney, Agent, or Firm*—Edward W. Callan

[57] ABSTRACT

An injection molding apparatus for high pressure injection molding of thermoplastic materials reduces counteractive deformation of desynchronously filled coaxially located molded cavities. The apparatus includes a clamping apparatus having left, center and right molding blocks for movement with respect to each along a common axis and defining first and second molding cavities. The center block includes left and right platens separated by a multitude of supporting columns. At least one of the columns is at least partly positioned above a first horizontal plane which is located at least 30% of a distance from the axis to a top of the platens and at least one of the columns is at lest partly positioned below a second horizontal plane which is located at least 30% of a distance from the axis to a bottom of the platens. Columns are similarly positioned in relation to first and second vertical planes. A top group of the supporting columns is located at least partly above a horizontal plane through said axis, and a bottom group of the supporting columns is located at least partly below said horizontal plane. The top group of supporting columns covers at least 10% of a top platen area above said horizontal plane and the bottom group of supporting columns covers at least 10% of a bottom platen area below said horizontal plane. Front and rear groups of the supporting columns are similarly located with respect to a vertical plane through said axis.

6 Claims, 1 Drawing Sheet

INJECTION MOLDING APPARATUS REDUCING COUNTERACTIVE DEFORMATION OF DESYNCHRONOUSLY FILLED COAXIALLY LOCATED MOLDING CAVITIES

BACKGROUND OF THE INVENTION

The present invention generally pertains to apparatus for injection molding of plastic products and is particularly directed to an injection molding apparatus for high pressure injection molding of thermoplastic materials which reduces counteractive deformation of a first molding cavity, the deformation occurring when desynchronously filling a second molding cavity which is coaxially positioned in relation to the first cavity.

It is believed that the problem of counteractive deformation of a first unfilled molding cavity, when desynchronously filling a second molding cavity has heretofore not been described.

Prior art description of desynchronously injected molding is shown in the following Hagerborg, U.S. Pat. Nos. 3,049,757 Teraoka, 3,417,433 Lohmann, 3,707,342 Bishop, 4,005,964 Balevski, 4,090,837 Tsuchiya, 4,242,073 Elly et al., 4,153,405 Sorensen, 4,400,341 Sorensen 4,464,327 and Sorensen 4,539,171.

SUMMARY OF THE INVENTION

The present invention provides an injection molding apparatus for high pressure injection molding of thermoplastic materials which reduces counteractive deformation of a first molding cavity, the deformation occurring when desynchronously filling a second molding cavity which is coaxially positioned in relation to the first cavity, the apparatus comprising: an injection apparatus for desynchronous filling of the first molding cavity and the second molding cavity; a clamping apparatus comprising left, center and right molding blocks for movement in respect to each other along a common axis and defining the first molding cavity between the left and center molding blocks and defining the second molding cavity between the center and right molding blocks; the center block comprising a left platen and a right platen separated by a multitude of supporting columns, at least one of the columns being at least partly positioned above a first horizontal plane said first horizontal plane being located at least 30% of a distance from the axis to a top of the left and right platens and additionally at least one of the columns being at least partly positioned below a second a horizontal plane said second horizontal plane being located at least 30% of a distance from the axis to a bottom of the left and right platens.

In another aspect of the invention the center block comprises a left platen and a right platen separated by a multitude of supporting columns, at least one of the columns being at least partly positioned in front of a first vertical plane said first vertical plane being located at least 30% of a distance from the axis to a front of the left and right platens and additionally, at least one of the columns being at least partly positioned in rear of a second vertical plane said second vertical plane being located at least 30% of a distance from the axis to a back of the left and right platens.

In yet another aspect of the invention the center block comprises a left platen and a right platen separated by a multitude of supporting columns including a top group of the supporting columns located at least partly above a horizontal plane through said axis and a bottom group of the supporting columns located at least partly below said horizontal plane, the top group of supporting columns covering at least 10% of a top platen area above said horizontal plane and the bottom group of supporting columns covering at least 10% of a bottom platen area below said horizontal plane.

And in one more aspect of the invention the center block comprises a left platen and right platen separated by a multitude of supporting columns including a front group of the supporting columns located at least partly in front of a vertical plane through said axis and a rear group of the supporting columns located at least partly in rear of said vertical plane, the front group of supporting columns covering at least 10% of a front platen area in front of said vertical plane and the rear group of supporting columns covering at least 10% of a rear platen area in rear of said vertical plane.

Additional features of the present invention are described in relation to the description of the preferred embodiments.

DESCRIPTION OF THE PREFERRED EMBODIMENT

Figure 1:
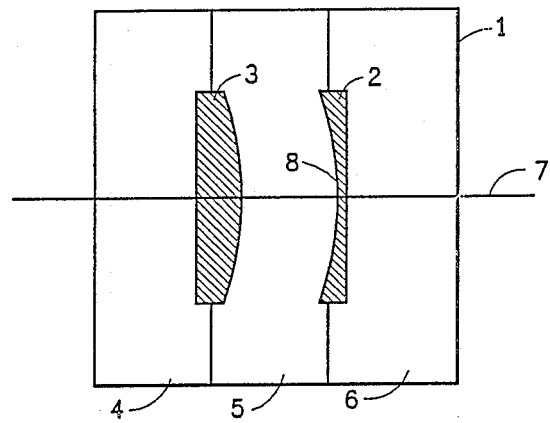
FIG. 1 is a partial sectional view of a Prior Art injection molding apparatus comprising left, center and right molding blocks.

Referring to FIG. 1 which illustrates prior art injection molding apparatus for high pressure injection molding of thermoplastic materials which does not reduce counteractive deformation of a right unfilled molding cavity 2 when prior thereto filling a left molding cavity 3.

U.S. Pat. Nos. 3,417,433, 4,153,405, 4,400,341, 4,464,327 and 4,539,171 are examples of such high pressure injection molding systems.

FIG. 1 further illustrates a part of a clamping apparatus comprising left molding block 4, center molding block 5, and right molding block 6 for movement in respect to each other along a common axis 7 and defining the left molding cavity 3 between the left and center molding blocks 4,5 and defining the right molding cavity 2 between the center and right molding blocks 5,6.

The center block 5 being one undivided platen or comprising a number of plates which are sandwiched or stacked together in an unseparated configuration.

The drawing shows a left molding cavity 3 which has just been filled and a right molding cavity 2 which has been filled earlier. The thermoplastic material which in the left molding cavity has been injected under high pressure, forces the steel of the center block 5 to bulge into the right molding cavity 2, thereby causing the counter active deformation 8. The drawing is not to scale, the deformation 8 has been exaggerated.

The counteractive deformation may give rise to a secondary problem. When the product in the right molding cavity 2 has been ejected, the right molding cavity 2 still has the bulge, consequently leaving the right molding cavity 2 with a reduced cavity thickness, which relatively to a normal balanced injection cycle reduces the injection pressure within in the right molding cavity 2 during injection, which in turn provides a relatively reduced force on the steel of the center block 5 causing a relatively reduced bulge on the left molding cavity 3.

When the product in the left molding cavity 3 has been ejected, the left molding cavity 3 still has a reduced size bulge relative to a normal balanced injection cycle, therefore leaving the left molding cavity 3 with a relatively increased cavity thickness, which relatively increases the injection pressure within in the left cavity 3 during injection, which in turn provides a relatively increased force on the steel of the center block 5 causing a relatively increased bulge on the left molding cavity 3, which may grow from cycle to cycle, thereby becoming a self enhancing vicious circle.

Figure 2A:
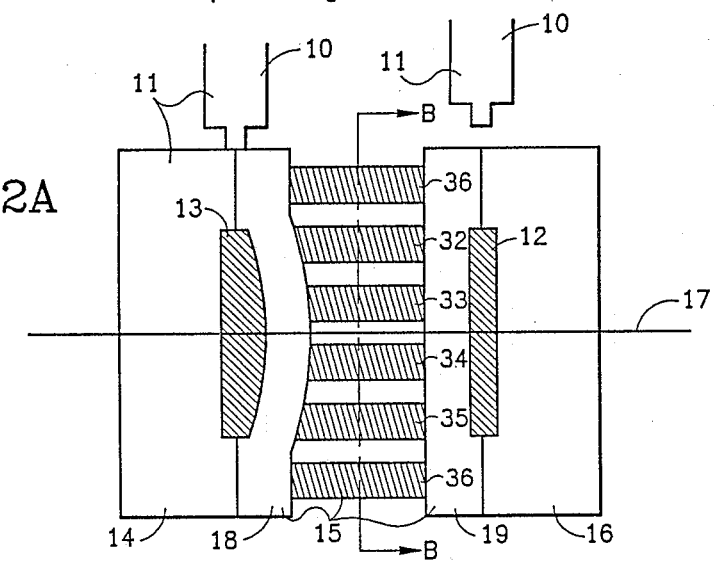
FIG. 2A is a partial sectional view of an injection molding apparatus according to the invention comprising left, center and right molding blocks.
Figure 2B:
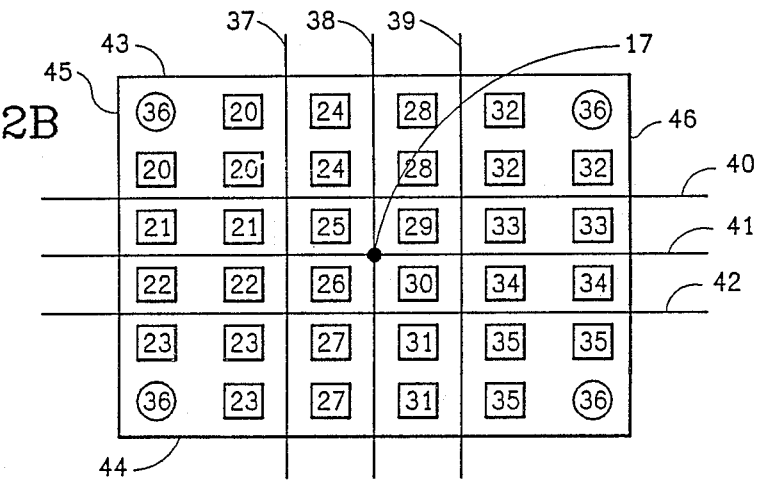
FIG. 2B is a sectional view of the left center and right molding blocks illustrated in FIG. 2 taken along section lines B—B.

Referring now to FIG. 2A and 2B illustrating a preferred embodiment of the present invention.

Shown is an injection molding apparatus 11 for high pressure injection molding of thermoplastic materials which reduces counteractive deformation of a first molding cavity 12, the deformation occurring when desynchronously filling a second molding cavity 13 which is coaxially positioned in relation to the first cavity.

The injection molding apparatus 11 comprises an injection apparatus 10 for desynchronous filling of the first and second molding cavity 12, 13. Any conventional injection apparatus may be adapted to the injection molding apparatus 11 as for example the injection apparatus shown in the patents mentioned under background of the invention above.

The invention is well suited for traditional injection molding apparatus where a left mold and a right mold are simultaneously compressed by the same clamping system and where the injection apparatus at same time in each production cycle is separated from a moving center block.

Illustrated is a part of a clamping apparatus comprising left molding block 14, center molding block 15 and right molding block 16 for movement in respect to each other along a common axis 17 and defining the second molding cavity 13 between the left and center molding blocks 14, 15 and defining the first molding cavity 12 between the center and right molding blocks 15, 16.

The center block 15 comprising a left platen 18 and a right platen 19, separated by a multitude of supporting columns 20, 21, 22, 23, 24, 25, 26, 27, 28, 29, 30, 31, 32, 33, 34, 35, a number of the columns 20, 24, 28, 32 being positioned above a horizontal plane 40 located at least 30% of the way from the axis 41 to the top 43 of the left and right platens 18, 19 and additionally a number of the columns 23, 27, 31, 35 being positioned below a horizontal plane 42 located at least 30% of the way from the axis 17 to the bottom 44 of the left and right platens 18, 19.

The center block 15 further comprises a left platen 18 and a right platen 19 separated by a multitude of supporting columns, 20, 21, 22, 23, 24, 25, 26, 27, 28, 29, 30, 31, 32, 33, 34, 35, a number of the columns 32, 33, 34, 35 being positioned in front of vertical plane 39 located at least 30% of the way from the axis 17 to the front 46 of the left and right platens 18, 19 and additionally a number of the columns 20, 21, 22, 23 being positioned in rear of a vertical plane 37 located at least 30% of the way from the axis 17 to the back 45 of the left and right platens 18, 19.

The center block 15 also comprises a left platen 18 and a right platen 19 separated by a multitude of supporting columns 20, 21, 22, 23, 24, 25, 26, 27, 28, 29, 30, 31, 32, 33, 34, 35, located above and below a horizontal plane 41 through said axis 17, the supporting columns 20, 21, 24, 25, 28, 29, 32, 33, 32, 33, which are located above the horizontal plane 41 through said axis 17 covers at least 10% of the platen area above said horizontal plane 41 and additionally the supporting columns 22, 23, 26, 27, 30, 31, 34, 35 which are located at below said horizontal plane 41 through said axis 17 covers at least 10% of the platen area below said horizontal plane 41.

The platen area is the area located between the top 43 and bottom 44 and the front 46 and the rear 45 of the left and right platens 18, 19. Also shown is tie bars 36 from the clamping system.

The center block 15 additionaly comprises a left platen 18 and a right platen 19 separated by a multitude of supporting columns 20, 21, 22, 23, 24, 25, 26, 27, 28, 29, 30, 31, 32, 33, 34, 35, located in front of and in rear of a vertical plane 38 through said axis, the supporting columns 28, 29, 30, 31, 32, 33, 34, 35 which are located in front of a vertical plane 38 through said axis 17 covers at least 10% of the platen area in front of said vertical plane 38 and additionally the supporting columns 20, 21, 22, 23, 24, 25, 26, 27 which are located in rear of said vertical plane 38 through said axis 17 covers at least 10% of the platen area in rear of said vertical plane 38.

The drawing shows a second molding cavity 13 which has just been filled and a first molding cavity 12 which has been filled earlier. The thermoplastic material which has been injected under high pressure, into the second molding cavity 13 does not force the steel of the center block to bulge into the second molding cavity 13 to thereby cause significant counter active deformation. The drawing is not to scale, the deformation has been exaggerated.

The force caused by high pressure filling of the second molding cavity 13 is not conveyed via the sturdy balanced support column system of the invention to the first molding cavity 12 to create a bulge 8 as it does when the center block is one undivided platen or comprises a number of plates which are sandwiched or stacked together in an unseparated configuration as shown in FIG. 1.

The prior art references such as Lohmann U.S. Pat. No. 3,707,342 and Balevski et al. U.S. Pat. No. 4,090,837, which disclose specialized low pressure injection molding apparatus for molding of structural foams illustrate U-shaped center blocks and weak unbalanced support columns which provide insufficient support to counteract the large clamping forces necessary for high pressure injection molding apparatus.

Such separation of left and right platens of the center block has been used in low pressure apparatus for structural foams in order to place an injection apparatus between the left and right platens.

The present invention furnish a number of other advantages. Sometimes it is desirous to have the product molded in the left cavity separated in distance from the product molded in the right molding cavity. Separation of the left and right part of the center block with support columns, solves the problem without adding significant weight to the center block.

When the left and right part or the center block are separated according to the invention, it is possible to gain access to the exposed parts with screws, core pulls, ejectors, compressed air, cooling water and the like.

While the above description contains many specificities, these should not be construed as limitations on the scope of the invention but rather as exemplification of the preferred embodiment thereof. Many other variations are possible, for example injection molding apparatus comprising several injection units and injection molding apparatus comprising several clamping units lined up coaxially. The injection molding apparatus may comprise a large number of molding blocks and a number of molding cavities between individual pairs of molding blocks. The supporting columns may be made from hydraulic or spring like means such as Bellville washers.

I claim:

1. An injection molding apparatus for high pressure injection molding of thermoplastic materials, said apparatus reducing counteractive deformation of a first molding cavity, the deformation occurring when desynchronously filling a second molding cavity which is coaxially positioned in relation to said first molding cavity, the apparatus comprising:

an injection apparatus for desynchronous filling of the first molding cavity and the second molding cavity; and a clamping apparatus comprising left, center and right molding blocks for movement with respect to each other along a common central horizontal axis, said first molding cavity being defined between the left and center molding blocks and said second molding cavity being defined between the center and right molding blocks;

the center block comprising a left platen and a right platen separated by a multitude of supporting columns connected to said left platen and said right platen, at least one of the columns being at least partly positioned above a first horizontal plane, said first horizontal plane being located at least 30% of a distance from said common central horizontal axis to a top of the left and right platens and additionally at least one of the columns being at least partly positioned below a second horizontal plane, said second horizontal plane being located at least 30% of a distance from said common central horizontal axis to a bottom of the left and right platens.

2. An injection molding apparatus according to claim 1, wherein at least one of the multitude of supporting columns is at least partly positioned in front of a first vertical plane, said first vertical plane being located at least 30% of a distance from said common central horizontal axis to a front of the left and right platens and additionally at least one of the columns being at least partly positioned in rear of a second vertical plane, said second vertical plane being located at least 30% of a distance from said common central horizontal axis to a back of the left and right platens.

3. An injection molding apparatus for high pressure injection molding of thermoplastic materials, said apparatus reducing counteractive deformation of a first molding cavity, the deformation occurring when desynchronously filling a second molding cavity which is coaxially positioned in relation to said first molding cavity, the apparatus comprising:

an injection apparatus for desynchronous filling of the first molding cavity and the second molding cavity; and a clamping apparatus comprising left, center and right molding blocks for movement with respect to each other along a common central horizontal axis, said first molding cavity being defined between the left and center molding blocks and said second molding cavity being defined between the center and right molding blocks;

the center block comprising a left platen and a right platen separated by a multitude of supporting columns, connected to said left platen and said right platen at least one of the columns being at least partly positioned in front of a first vertical plane, said first vertical plane being located at least 30% of a distance from said common central horizontal axis to a front of the left and right platens and additionally at least one of the columns being at least partly positioned in rear of a second vertical plane, said second vertical plane being located at least 30% of a distance from said common central horizontal axis to a back of the left and right platens.

4. An injection molding apparatus for high pressure injection molding of thermoplastic materials said apparatus reducing counteractive deformation of a first molding cavity, the deformation occurring when desynchronously filling a second molding cavity which is coaxially positioned in relation to said first molding cavity, the apparatus comprising:

an injection apparatus for desynchronous filling of the first molding cavity and the second molding cavity; and a clamping apparatus comprising left, center and right molding blocks for movement with respect to each other along a common central horizontal axis, said first molding cavity being defined between the left and center molding blocks and said second molding cavity being defined between the center and right molding blocks;

the center block comprising a left platen and a right platen separated by a multitude of supporting columns connected to said left platen and said right platen, a top group of the supporting columns located at least partly above a horizontal plane through said common central horizontal axis, and a bottom group of the supporting columns located at least partly below said horizontal plane, the top group of supporting columns covering at least 10% of a top platen area above said horizontal plane and the bottom group of supporting columns covering at least 10% of a bottom platen area below said horizontal plane.

5. An injection molding apparatus according to claim 4, wherein the multitude of supporting columns include a front group of supporting columns located at least partly in front of a vertical plane through said common central horizontal axis, and a rear group of the supporting columns located at least partly in rear of said vertical plane, the front group of supporting columns covering at least 10% of a front platen area in front of said vertical plane and the rear group of supporting columns covering at least 10% of a rear platen area in rear of said vertical plane.

6. An injection molding apparatus for high pressure injection molding of thermoplastic materials, said apparatus reducing counteractive deformation of a first molding cavity, the deformation occurring when desynchronously filling a second molding cavity which is coaxially positioned in relation to said first molding cavity, the apparatus comprising:

an injection apparatus for desynchronous filling of the first molding cavity and the second molding cavity; and a clamping apparatus comprising left, center and right molding blocks for movement with respect to each other along a common central horizontal axis, said first molding cavity being defined between the left and center molding blocks and said second molding cavity being defined between the center and right molding blocks;

the center block comprising a left platen and a right platen separated by a multitude of supporting columns connected to said left platen and said right platen, a front group of the supporting columns located at least partly in front of a vertical plane through said common central horizontal axis, and a rear group of the supporting columns located at least partly in rear of said vertical plane, the front group of supporting columns covering at least 10% of a front platen area in front of said vertical plane and the rear group of supporting columns covering at least 10% of a rear platen area in rear of said vertical plane.

* * * * *